(12) United States Patent
Dalmasso et al.

(10) Patent No.: US 7,273,205 B2
(45) Date of Patent: Sep. 25, 2007

(54) POSITIVE PRESSURE ACTUATED AERATOR VALVE ASSEMBLY

(75) Inventors: Christian Dalmasso, Meyssiez (FR); Bradley E. Pronschinske, Kewanee, IL (US); Michael J. Masterson, Bradford, IL (US)

(73) Assignee: Martin Engineering Company, Neponset, IL (US)

( * ) Notice: Subject to any disclaimer, the term of this patent is extended or adjusted under 35 U.S.C. 154(b) by 153 days.

(21) Appl. No.: 11/034,596

(22) Filed: Jan. 13, 2005

(65) Prior Publication Data

US 2005/0151100 A1 Jul. 14, 2005

Related U.S. Application Data

(60) Provisional application No. 60/536,446, filed on Jan. 14, 2004.

(51) Int. Cl.
 *F16K 31/12* (2006.01)
 *F16K 31/00* (2006.01)

(52) U.S. Cl. .......................................... 251/28; 251/14

(58) Field of Classification Search ................. 251/28, 251/12, 14, 26
 See application file for complete search history.

(56) References Cited

U.S. PATENT DOCUMENTS

| 2,635,634 | A | | 4/1953 | Thurber, Jr. |
| 2,664,916 | A | | 1/1954 | Conley |
| 3,070,112 | A | | 12/1962 | Fricke et al. |
| 3,192,782 | A | * | 7/1965 | Wantz .......................... 403/51 |
| 3,389,718 | A | * | 6/1968 | Johnson et al. .......... 137/492.5 |
| 3,788,527 | A | | 1/1974 | Matson |

(Continued)

FOREIGN PATENT DOCUMENTS

DE 1165955 3/1964

(Continued)

OTHER PUBLICATIONS

"slidable." Dictionary.com Unabridged (v 1.1). Random House, Inc. Jan. 26, 2007. <Dictionary.com http://dictionary.reference.com/browse/slidable>.*

*Primary Examiner*—Eric Keasel
*Assistant Examiner*—Andrew J. Rost
(74) *Attorney, Agent, or Firm*—Barnes & Thornburg LLP

(57) ABSTRACT

A positive pressure actuated aerator valve assembly adapted to discharge compressed gas into the chamber of a bulk material handling structure. The aerator valve assembly includes a housing and positive pressure actuated valve. The housing includes a chamber adapted to receive compressed gas and a discharge piston slideable between an extended position and a retracted position. The valve includes a valve body having an actuator piston seat and a fluid vent passageway in fluid communication with the actuator piston seat. An actuator piston is slideable with respect to the valve body between a retracted position and an extended position. A positive displacement force is applied to the actuator piston, such as by the supply of pressurized gas to the valve, to slide the actuator piston from the retracted position toward the extended position whereupon gas within the chamber of the housing flows through the fluid vent passageway and the discharge piston is moved from the extended position to the retracted position by gas within the chamber to thereby place the chamber of the housing in fluid communication with the fluid passageway of the piston seat.

20 Claims, 7 Drawing Sheets

U.S. PATENT DOCUMENTS

| | | | |
|---|---|---|---|
| 3,827,451 A | | 8/1974 | Roob |
| 3,895,648 A | | 7/1975 | Stoll et al. |
| 3,942,684 A | | 3/1976 | Stetson |
| 4,051,982 A | | 10/1977 | Stetson |
| 4,052,035 A | * | 10/1977 | Kenny et al. .................. 251/14 |
| 4,070,000 A | * | 1/1978 | Prescott ........................ 251/26 |
| 4,073,464 A | | 2/1978 | Hansen et al. |
| 4,346,822 A | | 8/1982 | Wadensten et al. |
| 4,579,138 A | | 4/1986 | Simoens |
| 4,676,402 A | | 6/1987 | Stetson |
| 4,703,869 A | | 11/1987 | De Rooy |
| 4,767,024 A | | 8/1988 | Rappen |
| 4,779,837 A | | 10/1988 | Mito et al. |
| 4,817,821 A | | 4/1989 | Simoens |
| 4,826,051 A | | 5/1989 | Milian |
| 4,848,721 A | | 7/1989 | Chudakov |
| 5,067,516 A | * | 11/1991 | Gale .......................... 137/414 |
| 5,143,256 A | | 9/1992 | Wadensten |
| 5,441,171 A | | 8/1995 | Maury |
| 5,441,302 A | | 8/1995 | Johnson et al. |
| 5,490,777 A | | 2/1996 | Matsumoto |
| 5,605,349 A | | 2/1997 | Childree |
| 5,607,181 A | | 3/1997 | Richardson et al. |
| 5,797,582 A | | 8/1998 | Simoens |
| 5,853,160 A | | 12/1998 | Hurdis et al. |
| 6,067,946 A | | 5/2000 | Bunker et al. |

FOREIGN PATENT DOCUMENTS

| | | |
|---|---|---|
| DE | 1576088 | 10/1969 |
| EP | 021999 | 1/1981 |
| EP | 1279622 | 1/2003 |
| FR | 2074786 | 10/1971 |
| FR | 2214651 | 8/1974 |
| FR | 2429952 | 1/1980 |
| WO | WO97/43195 | 11/1997 |

\* cited by examiner

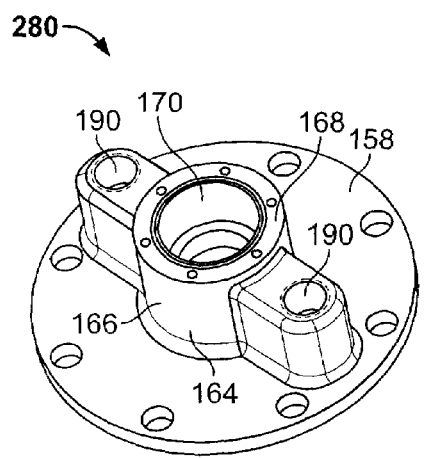
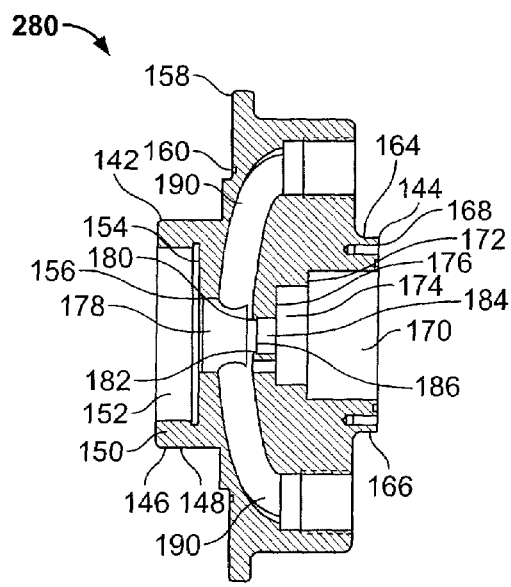
FIG. 9  FIG. 10
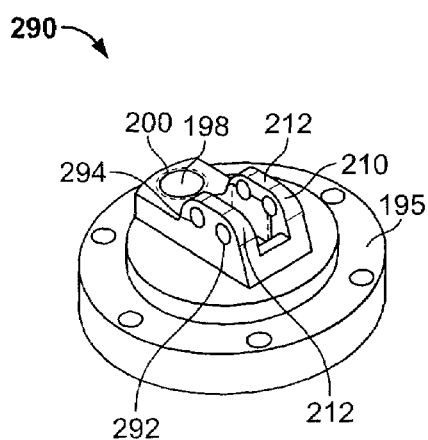
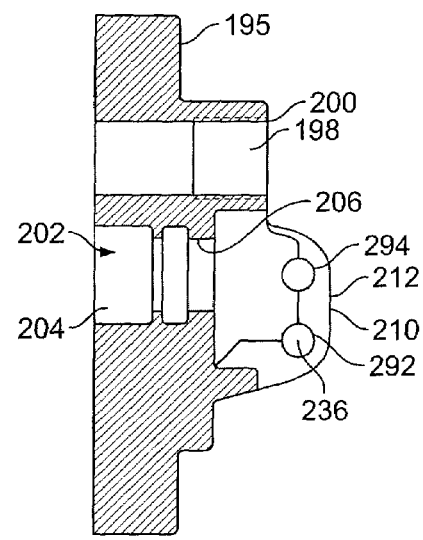
FIG. 11  FIG. 12

POSITIVE PRESSURE ACTUATED AERATOR VALVE ASSEMBLY

RELATED APPLICATIONS

This application claims the benefit of U.S. Provisional Application No. 60/536,446, filed Jan. 14, 2004.

BACKGROUND

The present disclosure is directed to a positive pressure actuated aerator valve assembly for use in connection with aerators such as air cannons, and in particular to an aerator valve assembly including a positive pressure actuated valve that is actuated in response to the supply of gas having a positive pressure to the valve.

The storage of granular and similar bulk materials in bins, silos and the like creates many problems, particularly in the discharge of such bulk material, as bulk material has the tendency to refuse to flow due to bridging and other problems. Aerators such as air cannons are used in connection with the handling and aeration of bulk material. An aerator stores a large volume of air or other gas under pressure in a pressure tank and then quickly releases the air instantaneously into the storage receptacle such that the blast of air causes any obstructing bulk material to dislodge, thereby enabling the bulk material to flow freely from the storage receptacle. Prior aerators were typically actuated by exhausting air to the atmosphere to create a pressure differential. The aerator valve assembly disclosed herein is actuated by providing a supply of compressed gas having a positive pressure to the valve.

SUMMARY

A positive pressure actuated aerator valve assembly including a housing and a positive pressure actuated valve. The housing includes a body and a piston seat. The body of the housing forms a chamber and includes a port in fluid communication with the chamber. The port is adapted to be placed in fluid communication with a source of pressurized gas. The piston seat includes a fluid passageway in selective fluid communication with the chamber. The fluid passageway of the piston seat is adapted to be placed in fluid communication with a chamber of a bulk material handling structure. A discharge piston is associate with the body of the housing and is selectively slideable with respect to the body between an extended position and a retracted position. The discharge piston is adapted to sealingly engage the piston seat when the discharge piston is in the extended position to thereby seal the chamber and port of the housing from the fluid passageway of the piston seat. The discharge piston is spaced apart from the piston seat when the discharge piston is in the retracted position to thereby place the chamber and the port of the housing in fluid communication with the fluid passageway of the piston seat. A resilient biasing member is located within the housing and resiliently biases the discharge piston from the retracted position toward the extended position.

The valve includes a body having an actuator piston seat and a fluid vent passageway in fluid communication with the actuator piston seat. The fluid vent passageway is in selective fluid communication with the chamber of the housing. The valve includes an actuator piston that is slideable with respect to the body of the valve between a retracted position and an extended position. The actuator piston is adapted to sealingly engage the actuator piston seat when the actuator piston is in the retracted position to thereby seal the fluid vent passageway from the chamber of the housing. The actuator piston is spaced apart from the actuator piston seat when the actuator piston is in the extended position to thereby place the fluid vent passageway in fluid communication with the chamber of the housing.

The actuator piston is selectively slideable from the retracted position toward the extended position by selective application of a positive displacement force to the actuator piston, such as by the supply of compressed gas to the body of the valve which acts upon the actuator piston, such that a fluid passageway is opened from the chamber of the housing to the fluid vent passageway of the valve. When the actuator piston is in the extended position, gas within the chamber of the housing flows through the fluid vent passageway of the valve, and gas within the chamber of the housing slides the discharge piston from the extended position toward the retracted position such that the chamber and port of the housing are in fluid communication with the fluid passageway of the piston seat. The valve also includes a plunger that is adapted to transfer a manually provided positive displacement force to the actuator piston.

BRIEF DESCRIPTION OF THE DRAWING FIGURES

FIG. 9 is a perspective view of a modified embodiment of the body of the positive pressure actuated valve.

FIG. 10 is a cross sectional view of the body shown in FIG. 9.

FIG. 11 is a perspective view of a modified embodiment of the cap of the positive pressure actuated valve.

FIG. 12 is a cross sectional view of the cap of FIG. 11.

DETAILED DESCRIPTION

Figure 1:
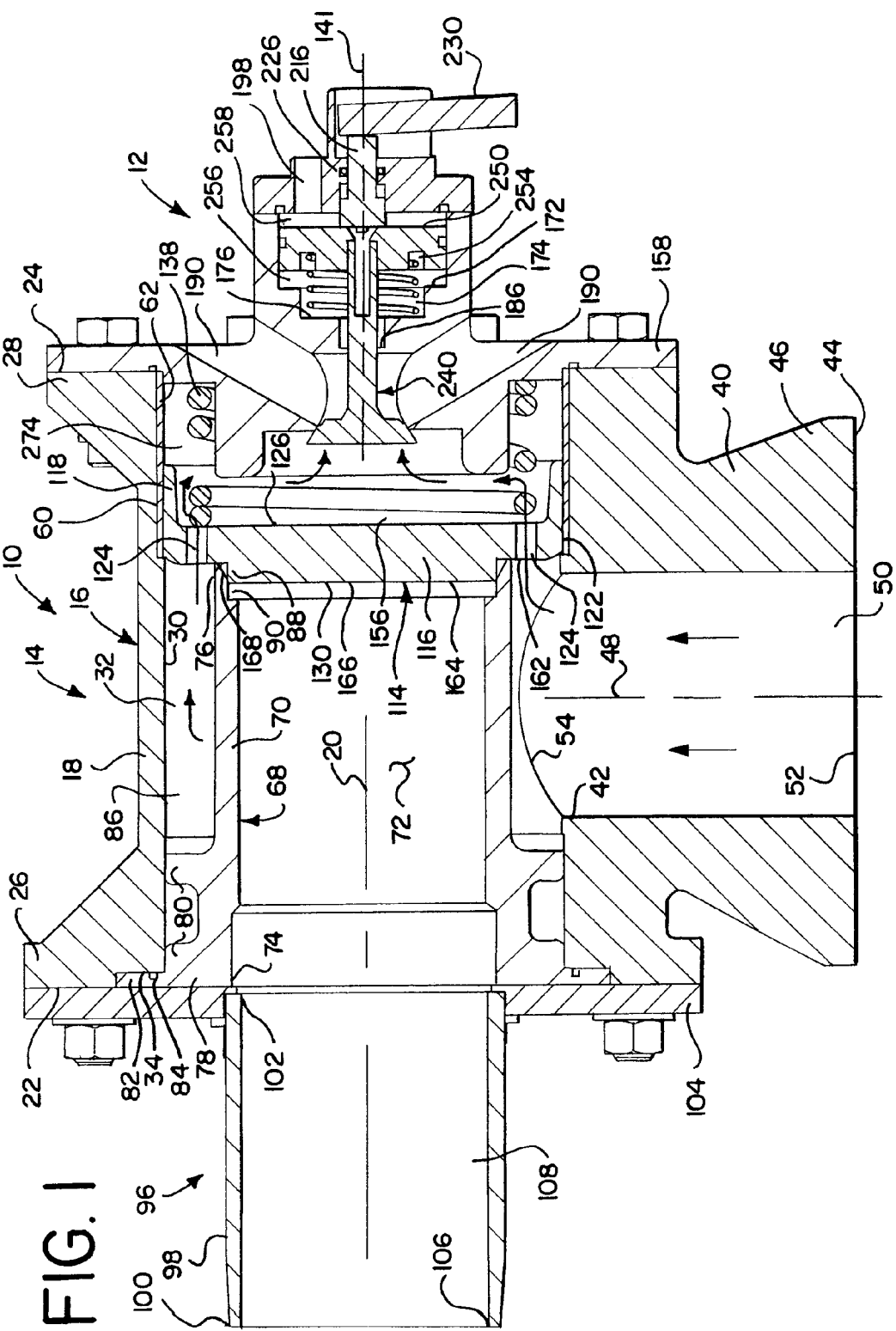
FIG. 1 is a cross-sectional view of the disclosed aerator valve assembly shown with the discharge piston in the extended charge position and the actuator piston in the retracted charge position.

As shown in the drawing figures, the positive pressure actuated aerator valve assembly 10 includes a positive pressure actuated valve 12 removably attached to a housing 14. The housing 14 includes a generally T-shaped body 16. The body 16 includes an elongate hollow generally cylindrical conduit or tube 18 having a central longitudinal axis 20, a first end 22 and a second end 24. The tube 18 includes a first flange 26 at the first end 22 and a second flange 28 at the second end 24. The tube 18 includes a generally cylindrical interior wall 30 that forms a chamber 32. The first flange 26 includes a generally circular and annular recessed seat 34 that extends along the inner circumference of the flange 26. The body 16 also includes a generally cylindrical extension conduit or tube 40 having a first end 42 attached to the tube 18 and a second end 44 having a flange 46. The flange 46 is adapted to be connected to a source of high pressure compressed gas such as air. The flange 46 may be connected to a pressure vessel or tank having a chamber to which the source of high pressure gas is connected. The extension conduit 40 includes a central axis 48 that is generally transverse or perpendicular to the central longitudinal axis 20 of the tube 18. The extension conduit 40 includes a fluid passage 50 that extends from a first port 52 located at the second end 44 of the extension conduit 40 to a second port 54 located at the first end 42 of the extension conduit 40. The second port 54 is also formed in the tube 18 such that the fluid passage 50 is in fluid communication with the chamber 32 of the tube 18.

The second end 24 of the tube 18 includes a generally cylindrical seat 60 that extends along the circumference of the interior surface of the tube 18 and that extends longitudinally from the second end 24 of the tube 18 to a position adjacent the port 54. A cylindrical bearing 62 is located within the cylindrical seat 60. The bearing 62 includes a cylindrical interior surface that forms a portion of the interior wall 30 of the tube 18. The bearing 62 includes a first end located adjacent to the port 54 and a second end located at the second end 24 of the tube 18. The interior surface of the bearing 62 has approximately the same diameter as the diameter of the interior wall 30 of the tube 18. The bearing 62 is preferably a self-lubricating bearing having a steel backing with a porous bronze inner-structure and a PTFE overlay.

The housing 14 also includes a discharge piston seat 68. The piston seat 68 includes a generally cylindrical conduit or tube 70 having a hollow bore forming a fluid passage 72. The tube 70 extends between a first end 74 and a second end 76. The tube 70 is located within the tube 18 generally concentrically about the longitudinal axis 20. The first end 74 of the tube 70 includes a generally cylindrical base 78 that extends outwardly from and around the tube 70. The base 78 includes two generally circular outwardly extending rings 80 that are located adjacent the interior wall of the tube 18. The base 78 also includes an outwardly extending generally circular flange 82. The flange 82 of the piston seat 68 is located within the circular seat 34 of the first flange 26 of the body 16. A resilient elastomeric sealing member 84, such as an O-ring, is located between the flange 82 and the flange 26 to create a gas-tight seal therebetween. The portion of the tube 70 of the piston seat 68 that extends beyond the base 78 is spaced apart from the interior wall 30 of the tube 18 of the body 16 such that an annular chamber 86 is formed therebetween. The annular chamber 86 is in fluid communication with the fluid passage 50. The second end 76 of the tube 70 includes a port 88 and a generally cylindrical recess 90 formed along the interior surface of the tube 70. The second end 76 of the tube 70 includes an interior chamfered sealing surface as described in U.S. Pat. No. 5,853,160 of Martin Engineering Company, which is incorporated herein by reference. The sealing surface is annular and forms the outlet port 88.

The housing 14 also includes an extension tube assembly 96. The extension tube assembly 96 includes a generally cylindrical extension tube 98 having a first end 100 and a second end 102. The extension tube 98 is located generally concentrically about the central axis 20. The second end 102 of the extension tube 98 is attached to a flange 104. The flange 104 is adapted to be removably connected to the first flange 26 of the tube 18 to thereby compress the flange 82 of the piston seat 68 between the flanges 26 and 104. The first end 100 of the tube 98 includes a port 106. The tube 98 includes a fluid passage 108 that is in fluid communication with the fluid passage 72 of the piston seat 68 and that is in fluid communication with the port 106. The first end 100 of the extension tube 98 may be attached to a flange (not shown) to facilitate the attachment of the aerator valve assembly 10 to a bulk material handling structure having a chamber adapted to receive and pass bulk granular material therethrough. The fluid passage 108 is adapted to be placed in fluid communication with the chamber of the bulk material handling structure. The bulk material handling structure may be a storage receptacle, bin, silo, transfer chute, duct work, or other bulk material handling structure.

The aerator valve assembly 10 also includes a discharge piston 114. The discharge piston 114 includes a generally circular plate-like diaphragm 116 and a generally cylindrical and annular skirt 118. The skirt 118 forms a hollow pocket 120 having an open end. The diaphragm 160 includes an outer peripheral edge 122. The skirt 118 extends along the peripheral edge 122 around the perimeter of the diaphragm 116 and extends outwardly and generally perpendicularly from the diaphragm 116. A plurality of bores 124 extend through the diaphragm 116 from an internal surface 126 to an external surface 128 of the diaphragm 116. The bores 124 form respective fluid passages. The bores 124 are located symmetrically with respect to one another about the center of the diaphragm 116 and about the axis 20. The diaphragm 116 includes an outwardly projecting raised portion 130 that is centrally located on the exterior side of the diaphragm 116. The projection 130 is generally circular and includes a generally circular planar surface 132, and a circular angled sealing surface 134 that extends around the circular perimeter of the planar surface 132. The bores 124 are located between the sealing surface 134 and the outer peripheral edge 122 of the diaphragm 116. The sealing surface 134 is disposed at the same angle as the chamfered sealing surface of the piston seat 68, such that the sealing surface 134 and the sealing surface of the piston seat 68 cooperatively and complimentarily mate and seal with one another when the sealing surfaces are brought into engagement with one another.

Figure 3:
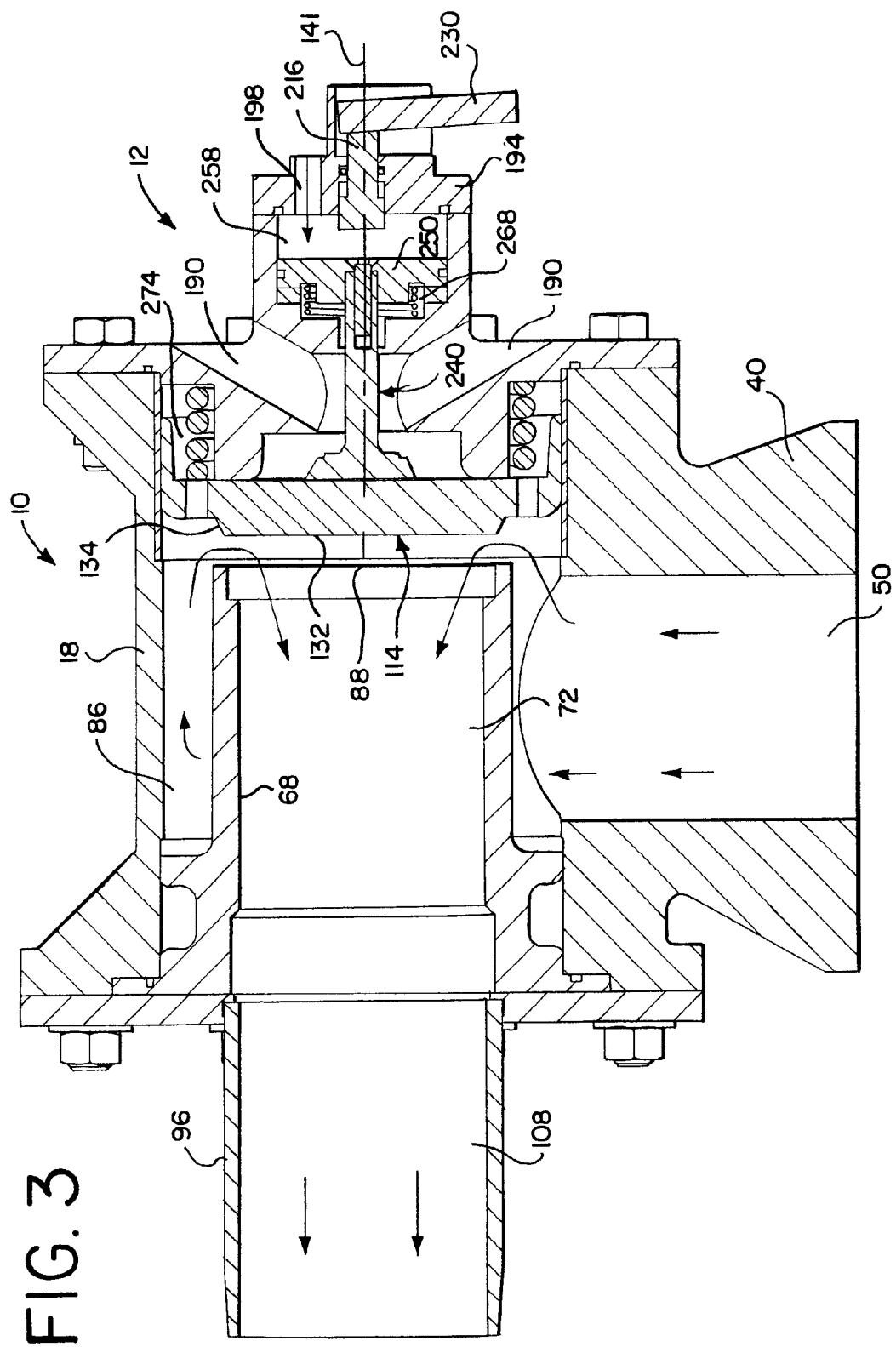
FIG. 3 is a cross-sectional view of the aerator valve assembly shown with discharge piston in the retracted discharge position and the actuator piston in the extended discharge position.

The discharge piston 114 is located within the chamber 32 of the tube 18 of the body 16 between the second end 24 of the tube 18 and the piston seat 68. The skirt 118 of the discharge piston 114 is located toward the second end 24 of the tube 18 and the projection 130 of the diaphragm 116 of the discharge piston 114 is located toward the piston seat 68. The diaphragm 116 and skirt 118 of the discharge piston 114 are located concentrically about the axis 20. The discharge piston 114 is longitudinally slideable along the central axis 20 between an extended charge position as shown in FIG. 1, wherein the discharge piston 114 sealingly engages the piston seat 68, and a retracted discharge position as shown in FIG. 3, wherein the discharge piston 114 is spaced apart from the piston seat 68. The skirt 118 of the discharge piston 114 slidably engages the interior surface of the cylindrical bearing 62 around the exterior perimeter of the skirt 118. The skirt 118 guides the piston 114 as it moves between the extended and retracted positions.

The aerator valve assembly 10 also includes a resilient biasing member 138, such as a helical coil spring. A first end of the biasing member 138 engages the interior surface 126 of the diaphragm 116 of the discharge piston 114 and is located within the skirt 118. The biasing member 138 extends from a first end adjacent to and along the internal perimeter of the skirt 118 toward a second end of the biasing member. The biasing member 138 resiliently biases the discharge piston 114 toward the piston seat 68 and toward the extended charge position of the discharge piston 114.

Figure 6:
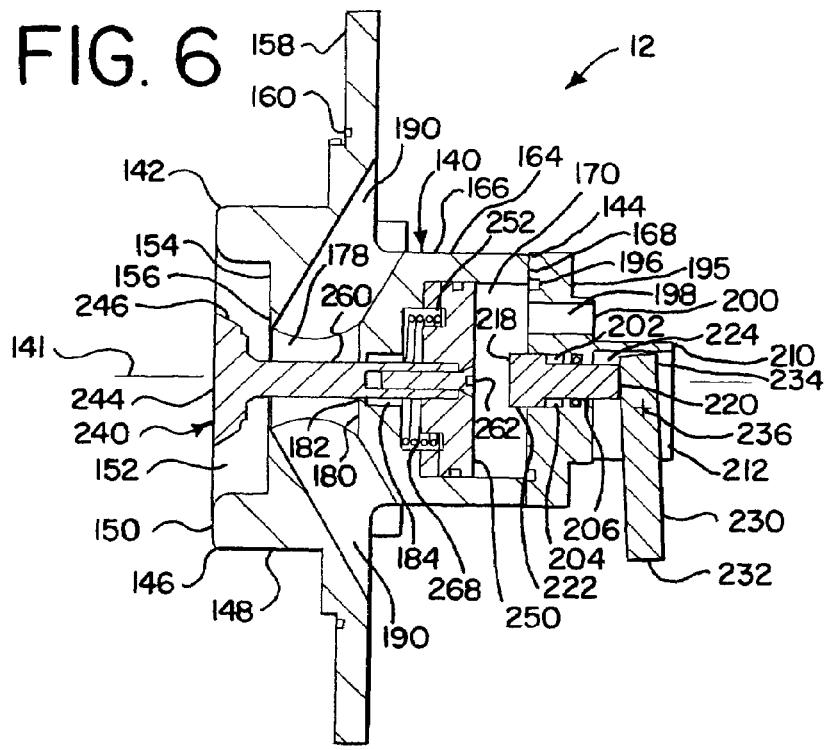
FIG. 6 is a cross-sectional view of the positive pressure actuated valve of the aerator valve assembly.
Figure 7:
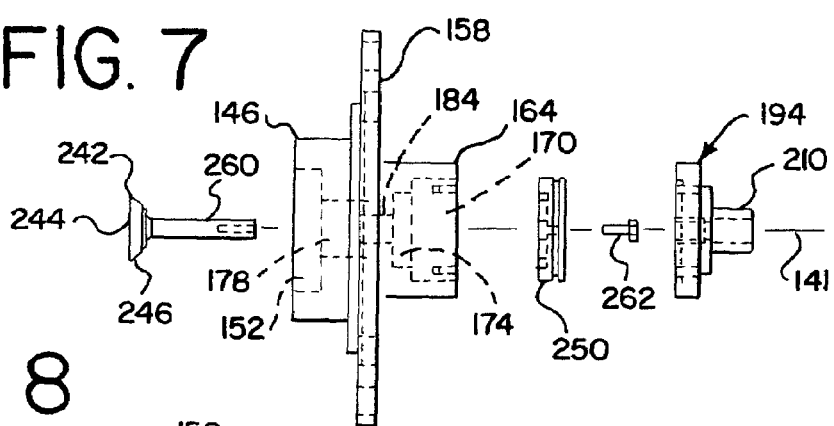
FIG. 7 is a partial exploded view of the positive pressure actuated valve.
Figure 8:
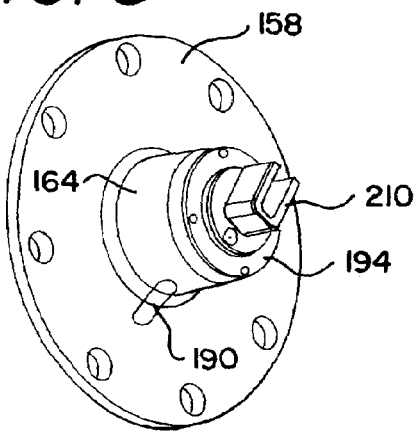
FIG. 8 is a perspective view of the positive pressure actuated valve.

As shown in FIGS. 1 and 6, the positive pressure actuated valve 12 includes a body 140 having a central longitudinal axis 141. The axis 141 is coaxial with the axis 20. The body 140 extends between a first end 142 and a second end 144. The body 140 includes a generally cylindrical hub 146 at the first end 142. The hub 146 includes a generally cylindrical side wall 148 and an annular planar end wall 150. The hub 146 includes a hollow generally cylindrical recess 152 that is located concentrically within the hub 146 and that extends inwardly from the end wall 150. The recess 152 forms a bottom wall 154 that includes a central generally circular aperture that forms a generally circular actuator piston seat 156. A flange 158 extends radially outwardly from and around the hub 146 generally perpendicular to the central longitudinal axis 141. A resilient elastomeric sealing member 160, such as an O-ring, is located on the interior surface of the flange 158 and extends around the hub 146. The flange 158 of the body 140 also includes a stem 164 that extends from the hub 146 to the second end 144 of the body 140. The stem 164 includes a generally cylindrical side wall 166 and a generally annular and circular planar end wall 168. The stem 164 includes a generally cylindrical first recess 170 that extends inwardly from the end wall 168 toward the first end 142 of the body 140. The first recess 170 forms a generally planar and annular inwardly extending ledge 172. The stem 164 includes a second recess 174 that extends from the ledge 172 to a bottom wall 176 having a circular central aperture. The first and second recesses 170 and 174 are concentrically located about the longitudinal axis 141.

The body 140 of the valve 12 includes a generally cylindrical bore 178 that extends from the actuator piston seat 156 to a generally annular wall 180 having a generally circular central aperture 182. The body 140 also includes a generally cylindrical bore 184 that extends from the central aperture in the bottom wall 176 to a generally annular end wall 186 that includes the aperture 182. The recess 152, bore 178, bore 184, second recess 174 and first recess 170 are all connected to one another. The body 140 includes one or more fluid vent passages 190. Each vent passage 190 includes a first end in fluid communication with the bore 178 and the actuator piston seat 156, and a second end that is in fluid communication with the atmosphere. A fluid passageway extends from the second recess 174 to a vent passage 190 such that the second recess 174 is in fluid communication with the atmosphere.

The positive pressure actuated valve 12 also includes a cap 194 that is removably attached to the end wall 168 of the stem 164 by threaded fasteners or the like. The cap 194 includes a body 195. A resilient elastomeric sealing member 196, such as an 0-ring, is located between the body 195 and the end wall 168 and is adapted to create a gas-tight seal therebetween. The body 195 includes a fluid passage 198 that extends through the body 195 and that is in fluid communication with the first recess 170 of the stem 164. The fluid passage 198 includes a port 200 that is adapted to be attached in fluid communication with a source of compressed pressurized gas, such as air. The port 200 may be attached in fluid communication with a valve, such as a solenoid valve, to control the flow of gas into and out of the port 200 and fluid passageway 198. The body 195 includes a stepped-bore 202 that extends through the body 195 from its internal surface to its external surface. The bore 202 includes a large diameter recess 204 that extends inwardly from the interior surface of the body 195 and a reduced diameter recess 206 that extends inwardly from the outer surface of the body 195. The body 195 also includes a generally U-shaped collar 210 that is attached to the external surface of the body 195. The collar 210 includes a two spaced apart opposing side walls 212.

The cap 194 includes a plunger 216 slidably located within the bore 202. The plunger 216 includes a first end 218 and a second end 220. The plunger 216 includes a generally cylindrical head 222 at the first end 218 that is adapted to fit closely within the large diameter recess 204 of the bore 202. The plunger 216 also includes a generally cylindrical shaft 224 that extends from the second end 220 to the head 222. The shaft 224 extends through the reduced diameter recess 206 of the bore 202 such that the second end 220 of the plunger 216 is located within the collar 210 between the side walls 212. A resilient elastomeric sealing member 226, such as an O-ring, is located between the shaft 224 of the plunger 216 and the side wall of the reduced diameter recess 206 of the bore 202 to create a gas-tight seal therebetween, while allowing the plunger 216 to slidably move between a retracted position and an extended position along the axis 141. The cap 194 also includes a manual actuator member 230, such as a lever, trigger or button. The actuator member 230 extends between a first end 232 and a second end 234. The actuator member 230 is pivotally attached to the side walls 212 of the collar 210 such that the first and second ends 232 and 234 pivot about a pivot axis 236 with respect to the body 195 of the cap 194.

The positive pressure actuated valve 12 also includes an actuator piston 240. The actuator piston 240 includes a head 242. The head 242 includes a generally circular and planar outer end wall 244 and a generally conical-shaped side wall 246. A first end of the conical side wall 246 includes a large diameter circular edge located at the end wall 244 and a second end of the side wall 246 includes a reduced diameter circular edge. The side wall 246 of the actuator piston 240 is adapted to releasably engage the piston seat 156 to selectively create a gas-tight seal therewith. The actuator piston 240 also includes a generally cylindrical diaphragm 250 located within the first recess 170 of the stem 164. The outer peripheral edge of the diaphragm 250 includes a resilient elastomeric sealing member 252, such as an O-ring. The sealing member 252 creates a gas-tight seal between the diaphragm 250 and the internal wall of the stem 164 while allowing sliding movement of the diaphragm 250 within the first recess 170 between a retracted position and an extended position. The interior side of the diaphragm 250 includes an elongate generally circular groove 254. The actuator piston 240 also includes a generally cylindrical stem 260 that is attached at a first end to the internal surface of the head 242 and that is removably attached at a second end to the diaphragm 250 by a fastener 262. The diaphragm 250 and the head 242 thereby slide conjointly with one another between a retracted position and an extended position along the axis 141. The diaphragm 250 divides the recesses within the stem 164 into a first chamber 256 that is located between the diaphragm 250 and the bottom wall 176 of the second recess 174, and a second chamber 258 that is located between the diaphragm 250 and the cap 194.

Figure 2:
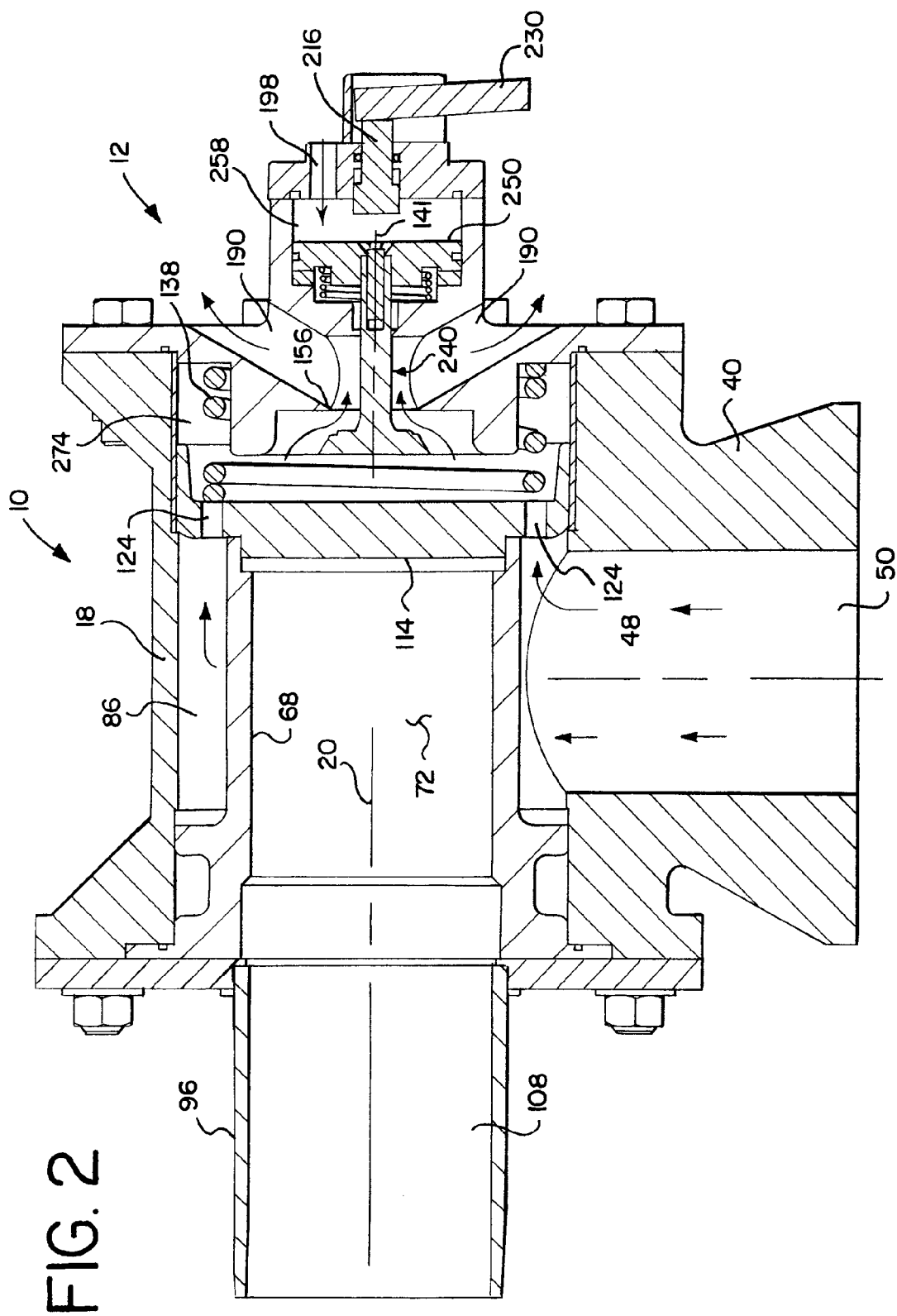
FIG. 2 is a cross-sectional view of the aerator valve assembly shown with the discharge piston in the extended charge position and the actuator piston in the extended discharge position.

The positive pressure actuated valve 12 also includes a resilient biasing member 268, such as a helical coil spring. The biasing member 268 has a first end in engagement with the bottom wall 276 of the second recess 174 of the stem 164, and a second end located within the circular groove 254 of the diaphragm 250. The biasing member 268 resiliently biases the actuator piston 240 from the extended discharge position as shown in FIG. 2 to the retracted charge position as shown in FIG. 1.

As shown in FIG. 1, when the positive pressure valve 12 is attached to the housing 14, a fluid chamber 274 is formed between the discharge piston 114 and the body 140 of the positive pressure actuated valve 12. The biasing member 138 extends between the discharge piston 114 and the body 140 of the positive pressure actuated valve 12, and extends around the side wall 148 of the hub 146 of the body 140.

FIGS. 9 and 10 show an alternate embodiment of the body of the positive pressure actuated valve 12 identified with the reference number 280. The body 280 is constructed substantially similar to the body 140 and similar elements are identified with the same reference numbers.

FIGS. 11 and 12 show an alternate embodiment of the cap of the positive pressure actuated valve 12 identified with the reference number 290. The cap 290 is constructed substantially similar to the cap 194 and similar elements are identified with the same reference numbers. Each side wall 212 of the collar 210 includes an aperture 292 and an aperture 294. The apertures 292 are coaxially aligned with one another along the pivot axis 236. The apertures 294 are also coaxially aligned with one another. The apertures 294 are adapted to removably receive a locking pin. The locking pin is adapted to be removably inserted through at least one aperture 294 and through an aperture in the actuator member 230 such that the locking pin prevents movement of the actuator member 230 about the pivot axis 236 and thereby prevents accidental manual actuation of the valve 12 and aerator valve assembly 10 by the actuator member 230. The locking pin is manually removed from the aperture in the actuator member 230 to permit manual pivotal movement of the actuator member 230 about the pivot axis 236 with respect to the body 195 of the cap 290.

In operation, as shown in FIG. 1, the discharge piston 114 is located in its extended charge position and the actuator piston 240 is located in its retracted charge position. When the discharge piston 166 is in its extended charge position, the sealing surface 184 of the discharge piston 114 sealingly engages the sealing surface of the piston seat 68 to create a gas-tight seal therebetween. A fluid passage from the fluid passage 50 of the extension conduit 40, through the annular chamber 86, and through the port 88 of the piston seat 68 to the fluid passage 72 of the piston seat 68 is thus sealed closed by the discharge piston 114. When the actuator piston 240 is in its retracted charge position, the conical side wall 246 of the actuator piston 240 creates a gas-tight seal with the actuator piston seat 156 to seal closed a fluid passage from the fluid chamber 274 through the actuator piston seat 156 to the vent passages 190. Pressurized gas may flow through a fluid passage extending from the fluid passage 50 in the extension conduit 40, through the annular chamber 86, through the bores 124 in the discharge piston 114, and into the fluid chamber 274. The pressurized gas within the fluid chamber 274 biases the discharge piston 114 to its extended charge position and acts upon the end wall 244 of the head 242 of the actuator piston 240 to bias the actuator piston 240 toward its retracted charge position. The first chamber 256 of the positive pressure actuated valve 12 is in fluid communication with the vent passages 190 through the aperture 182 and bore 184 and is therefore at atmospheric pressure. A storage tank or other vessel attached to the extension conduit 40 may then be fully charged with compressed gas, such as air, at a desired pressure greater than atmospheric pressure.

When the compressed gas in the storage tank is to be discharged into the storage bin, pressurized air having a positive pressure greater than atmospheric pressure is supplied to the second chamber 258 of the positive pressure actuated valve 12 through the fluid passage 198. The surface area of the diaphragm 250 that is in communication with the second chamber 258 is larger than the surface area of the end wall 244 of the head 242 of the actuator piston 240. Therefore, if the gas within the second chamber 258 is at the same pressure as the gas within the fluid chamber 274, the pressurized gas within the second chamber 258 may provide a sufficient resulting biasing force to bias the actuator piston 240 toward the extended discharge position as shown in FIG. 2, while overcoming the force of the gas in the fluid chamber 274 and biasing force of the biasing member 268, to compress the biasing member 268 and slide the actuator piston 240 from the retracted position toward the extended position.

When the actuator piston 240 is in the extended discharge position as shown in FIG. 2, the seal between the head 242 and the actuator piston seat 156 is broken such that a fluid passage extends from the fluid chamber 274, through the recess 152 of the hub 146, through the actuator piston seat 156 to the bore 178, and through the vent passages 190 to the atmosphere. The pressure of the gas within the fluid chamber 274 is thereby reduced to atmospheric pressure. A pressure differential is consequently created between the pressure of the gas in the fluid chamber 274 that is at atmospheric pressure, and the pressure of the gas within the annular chamber 86 that is pressurized at a pressure greater than atmospheric pressure. The pressure of the gas on the exterior side of the piston 114 is now greater than the pressure of the gas on the interior side of the piston 114. The gas force acting on the exterior side of the piston 114, which force attempts to slide the piston 114 to the retracted position, is larger than the cumulative force exerted on the piston 114 by the pressure of the gas acting on the interior side of the piston 114 plus the biasing force exerted by the biasing member 138, which forces attempt to slide the piston 114 to the extended position. The differential in gas pressure, and the resulting difference in the gas pressure forces applied to the piston 114, cause the piston 114 to slide from the extended charge position as shown in FIGS. 1 and 2, toward the positive pressure valve 12 and toward the discharge position of the piston 114 as shown in FIG. 3, while compressing the biasing member 138.

The movement of the piston 114 from the extended position to the retracted position breaks the seal created between the piston 114 and the piston seat 68 and opens the fluid passage from the compressed gas storage tank, through the fluid passage 50 of the extension conduit 40, through the annular chamber 86, through the port 88 of the piston seat 68 and into the fluid passage 72. The gas flows from the passage 72 through the fluid passage 108 and out the port 106 of the extension tube assembly 96 and into the chamber of the storage bin to dislodge the granular material therein.

After the pressurized gas in the pressure tank has been discharged through the piston seat 68 and extension tube assembly 96, the supply of pressurized gas to the second chamber 258 of the positive pressure actuated valve 12 is turned off, and the second chamber 258 is placed in fluid communication with the atmosphere through the fluid passageway 198. The gas within the second chamber 258 consequently returns to atmospheric pressure. The gas in the first chamber 256 and the second chamber 258 are therefore both at atmospheric pressure. The biasing member 268 then biases the actuator piston 240 to the retracted position as shown in FIG. 1 wherein the head 242 creates a seal with the actuator piston seat 156. A supply of pressurized gas from the pressure tank then flows through the passage 50, the annular chamber 86, and the bores 124 in the discharge piston 114 into the fluid chamber 274. The pressure of the gas within the fluid chamber 274 thereby equalizes with the pressure of the compressed gas within the annular chamber 86, and the biasing member 138 biases the discharge piston 114 to the extended charge position as shown in FIG. 1 thereby creating a seal with the piston seat 68. The charging and discharging cycles of the aerator valve assembly 10 may then be selectively continued.

Figure 4:
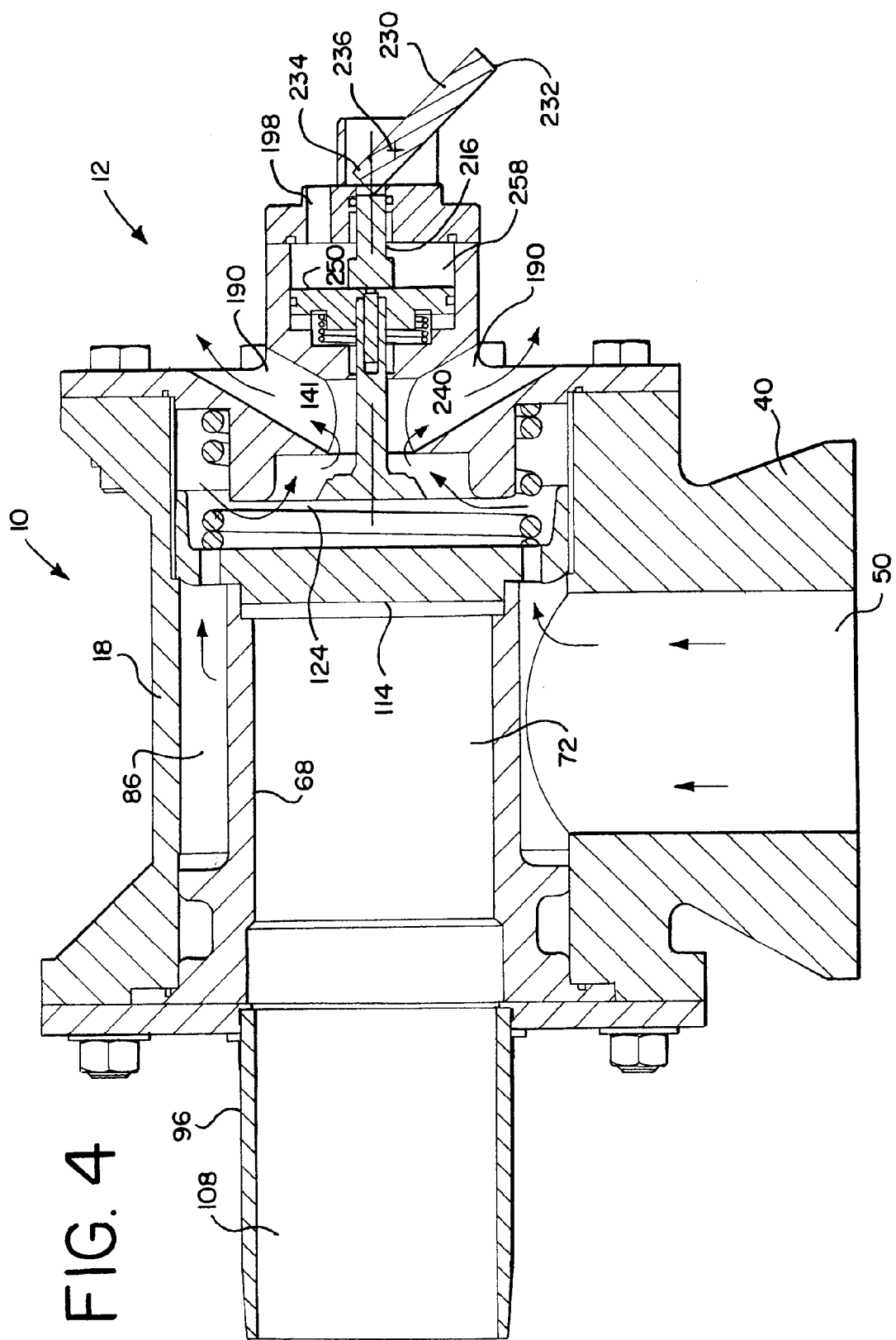
FIG. 4 is a cross-sectional view of the aerator valve assembly shown with the discharge piston in the extended charge position and the actuator piston manually moved to the extended discharge position.
Figure 5:
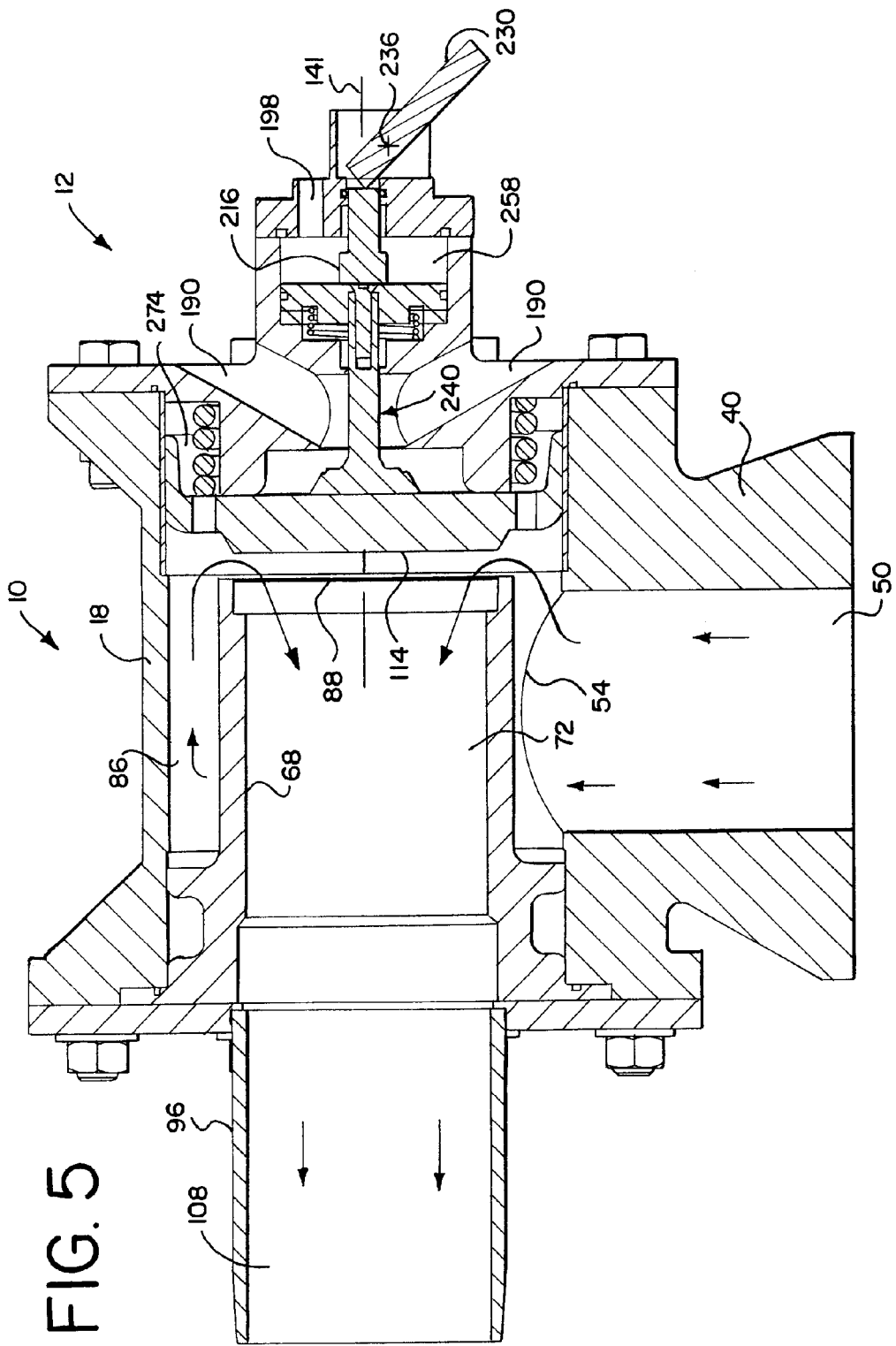
FIG. 5 is a cross-sectional view of the aerator valve assembly shown with the discharge piston in the retracted discharge position and the actuator piston manually moved to the extended discharge position.

As shown in FIGS. 4 and 5, the aerator valve assembly 10 may be manually actuated to discharge compressed gas from a pressure tank attached to the extension conduit 40. As shown in FIG. 4, the first end 232 of the manual actuator member 230 is manually grasped and pivoted in a counterclockwise direction about the pivot axis 236. The second end 234 of the manual actuator member 230 is thereby also pivoted about the pivot axis 236 into engagement with the second end 220 of the plunger 216. Continued counterclockwise pivotal movement of the manual actuator member 230 causes the plunger 216 to slide along the axis 141 from its retracted position, as shown in FIG. 1, to its extended position as shown in FIG. 4. As the plunger 216 moves from the retracted position toward the extended position, the head 222 of the plunger 216 engages the diaphragm 250 of the actuator piston 240 and slides the actuator piston 240 along the axis 141 from its retracted position toward its extended discharge position as shown in FIG. 4. The pressurized gas within the fluid chamber 274 is then exhausted to the atmosphere through the vent passages 190 as described above. The discharge piston 114 then moves toward its retracted position as described above to discharge gas from the pressure tank through the piston seat 68 and extension tube assembly 96.

After the compressed gas has been discharged from the pressure tank, the manual actuator member 250 may be released. The biasing member 268 then slides the actuator piston 240 and the plunger 216 from their extended discharge positions to their retracted charge positions. As the plunger 216 slides back to its retracted position, the plunger 216 pivots the manual actuator member 230 from its discharge position as shown in FIG. 4 to its charge position as shown in FIG. 1. The manual charging and discharging cycles of the aerator valve assembly 10 may be continued selectively as desired.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. The combination of a discharge piston movable to close a fluid passage and to open the fluid passage and an actuator piston operable to assist with biasing the discharge piston to move to close and to move to open comprising:

a discharge piston movable along an axis,
a body including a recess, an actuator piston seat, and a fluid vent passageway in fluid communication with said actuator piston seat;
an actuator piston associated with said body, said actuator piston including a head and a diaphragm having a first surface and a second surface, said actuator piston being slideable along the axis and with respect to said body between a retracted position and an extended position, said diaphragm being located within said recess of said body such that said diaphragm is slideable within said recess as said piston slides between said retracted position and said extended position, said head adapted to sealingly engage said actuator piston seat when said actuator piston is in said retracted position, said head adapted to be disengaged from said actuator piston seat when said actuator piston is in said extended position;
a biasing member located within said recess of said body in operative engagement with said diaphragm, said biasing member adapted to resiliently bias said actuator piston toward said retracted position; and
a plunger having a first end and a second end, said plunger being selectively slideable with respect to said body between a retracted position and an extended position, said first end of said plunger adapted to engage said diaphragm, said second end of said plunger adapted to receive a positive displacement force such that said plunger transfers said positive displacement force to said diaphragm;
whereby said actuator piston is selectively slideable from said retracted position toward said extended position by selective application of said positive displacement force to said second surface of said diaphragm such that a first fluid passageway extends through said actuator piston seat.

2. The valve of claim 1 wherein said recess of said body includes a first chamber located adjacent said first surface of said diaphragm and a second chamber located adjacent said second surface of said diaphragm.

3. The valve of claim 2 wherein said biasing member is located within said first chamber.

4. The valve of claim 2 including a second fluid passageway in fluid communication with said second chamber, said second fluid passageway adapted to selectively supply compressed gas to said second chamber, said compressed gas adapted to apply the positive displacement force to said actuator piston to slide said actuator piston from said retracted position toward said extended position.

5. The valve of claim 4 including a cap attached to said body, said cap forming a portion of said recess, said second fluid passageway extending through said cap.

6. The valve of claim 1 including an actuator member adapted to apply said positive displacement force to said second end of said plunger.

7. The valve of claim 1 wherein said actuator piston includes a stem, said stem attaching said head to said diaphragm, said stem located adjacent said first surface of said diaphragm and extending through said actuator piston seat.

8. The valve of claim 1 wherein said body includes a hub, said hub including said actuator piston seat and an outwardly extending flange.

9. The valve of claim 1 and further including a bore in the discharge piston, the bore extending in a direction generally parallel to the axis, the bore being located adjacent the periphery of the discharge piston.

10. A valve assembly including:
a housing including a first body and a piston seat, said first body forming a chamber and including a port in fluid communication with said chamber, said port adapted to be placed in fluid communication with a source of pressurized gas, said piston seat including a fluid passageway in selective fluid communication with said chamber;
a discharge piston associated with said first body having an interior side and an exterior side and one or more fluid passages extending through said discharge piston from said interior side to said exterior side, said discharge piston being selectively slideable with respect to said first body between an extended position and a retracted position, said discharge piston adapted to sealingly engage said piston seat when said discharge piston is in said extended position to thereby seal said chamber and said port from said first fluid passageway of said piston seat, said exterior side of discharge piston being spaced apart from said piston seat when said discharge piston is in said retracted position to thereby place said chamber and said port in fluid communication with said fluid passageway of said piston seat;
a first biasing member associated with said housing, said first biasing member resiliently biasing said discharge piston from said retracted position toward said extended position; and
a valve associated with said housing, said valve including a second body having an actuator piston seat and a fluid vent passageway in fluid communication with said actuator piston seat, a fluid chamber formed between said interior side of said discharge piston and said second body in fluid communication with said port of said chamber, said actuator piston seat being in selective fluid communication with said chamber of said housing, said valve including an actuator piston slideable with respect to said second body between a retracted position and an extended position, said actuator piston adapted to sealingly engage said actuator piston seat when said actuator piston is in said retracted position to thereby seal said fluid vent passageway from said chamber, said actuator piston being spaced apart from said actuator piston seat when said actuator piston is in said extended position to thereby place said fluid vent passageway in fluid communication with said chamber;
whereby said actuator piston is selectively slideable from said retracted position toward said extended position by selective application of a positive displacement force to said actuator piston such that a fluid passageway is opened from said chamber of said housing to said fluid vent passageway of said valve, whereupon gas within said chamber of said housing is adapted to slide said discharge piston from said extended position toward said retracted position such that said chamber and said port of said housing are in fluid communication with said fluid passageway of said piston seat.

11. The valve assembly of claim 10 wherein second body of said valve includes a recess, and said actuator piston includes a head and a diaphragm, said diaphragm located in said recess, said head adapted to selectively sealingly engage said actuator piston seat.

12. The valve assembly of claim 11 wherein said recess of said second body of said valve includes a first chamber located adjacent a first surface of said diaphragm and a second chamber located adjacent a second surface of said diaphragm.

13. The valve assembly of claim 12 including a second fluid passageway in fluid communication with said second chamber of said valve, said second fluid passageway adapted to selectively supply compressed gas to said second chamber, said compressed gas adapted to apply said positive displacement force to said actuator piston.

14. The valve assembly of claim 12 wherein said actuator piston includes a stem attaching said head to said diaphragm, said stem coupled to said first surface of said diaphragm and extending through said actuator piston seat.

15. The valve assembly of claim 11 including a biasing member located within said recess, said biasing member adapted to resiliently bias said actuator piston toward said retracted position.

16. The valve assembly of claim 11 including a plunger having a first end and a second end, said plunger being selectively slideable with respect to said second body of said valve between a retracted position and an extended position, said first end of said plunger adapted to engage said diaphragm of said actuator piston, said second end of said plunger adapted to receive said positive displacement force such that said plunger transfers said positive displacement force to said diaphragm.

17. A method of operating an aerator valve assembly, said method comprising the steps of:
providing a housing and a valve associated with said housing, said housing having a chamber adapted to receive a supply of compressed gas through a port in fluid communication with said chamber, a piston seat having a fluid passageway in selective fluid communication with said chamber, and a discharge piston selectively slideable with respect to said piston seat between a retracted position and an extended position, said discharge piston including an exterior side and an interior side, said exterior side of said discharge piston comprising a first portion of the discharge piston having a bore extending from the exterior side to the interior side and a second portion of the discharge piston in fluid communication with said port which sealingly engages said piston seat when said discharge piston is in said extended position to thereby seal said chamber from said fluid passageway, said valve including a body having an actuator piston seat in selective fluid communication with said chamber of said housing and a fluid vent passageway in fluid communication with said actuator piston seat, said valve including an actuator piston associated with said body, said actuator piston being selectively slideable between a retracted position and an extended position, said actuator piston adapted to sealingly engage said actuator piston seat when said actuator piston is in said retracted position to thereby seal said fluid vent passageway from said chamber of said housing;
providing a positive displacement force to said actuator piston, said positive displacement force adapted to slide said actuator piston from said retracted position toward said extended position such that said fluid vent passageway is in fluid communication with said chamber of said housing;
discharging gas from said chamber of said housing into said fluid vent passageway; and
providing a gas force to said first portion of the exterior side of said discharge piston by said compressed gas within said chamber;
sliding said discharge piston from said extended position toward said retracted position in response to said provision of said gas force thereby placing said chamber in fluid communication with said fluid passageway of said piston seat.

18. The method of claim 17 wherein said valve includes a biasing member, said biasing member resiliently biasing said actuator piston toward said retracted position.

19. The method of claim 17 wherein said step of providing a positive displacement force to said actuator piston comprises providing compressed gas to said valve, said compressed gas adapted to provide said positive displacement force to said actuator piston.

20. The method of claim 17 wherein said valve includes a moveable plunger, said step of providing a displacement force to said actuator piston comprising applying said positive displacement force to said plunger whereby said plunger transfers said positive displacement force to said piston.

* * * * *